United States Patent
LaGarde et al.

(10) Patent No.: US 6,668,982 B2
(45) Date of Patent: Dec. 30, 2003

(54) DISK-BRAKE AND TORQUE-TRANSMITTING DEVICE

(75) Inventors: Eric LaGarde, Sallanches (FR); David Chatellard, Saint-Gervais-les-Bains (FR); Frédéric Volle, Ville-la-Grand (FR)

(73) Assignee: Somfy, Cluses (FR)

( * ) Notice: Subject to any disclaimer, the term of this patent is extended or adjusted under 35 U.S.C. 154(b) by 0 days.

(21) Appl. No.: 10/325,637

(22) Filed: Dec. 20, 2002

(65) Prior Publication Data

US 2003/0136615 A1 Jul. 24, 2003

(30) Foreign Application Priority Data

Dec. 28, 2001 (FR) .............................. 01 17006

(51) Int. Cl.⁷ .............................................. B60J 13/04
(52) U.S. Cl. ...................................................... 188/171
(58) Field of Search ................................ 188/82.9, 129, 188/130, 135, 136, 170, 171; 192/48.1–48.92

(56) References Cited

U.S. PATENT DOCUMENTS

| | | |
|---|---|---|
| 3,068,975 A | 12/1962 | Theuer |
| 4,508,318 A * | 4/1985 | Maeda ........................ 254/350 |
| 4,531,419 A * | 7/1985 | Botz et al. .............. 74/388 PS |
| 5,019,734 A * | 5/1991 | Bernd et al. ................... 310/77 |

FOREIGN PATENT DOCUMENTS

| | | |
|---|---|---|
| DE | 834 714 C | 3/1952 |
| FR | 2 720 806 A | 12/1995 |
| FR | 2 745 126 A | 8/1997 |

OTHER PUBLICATIONS

Preliminary Search Report in SN FR 0117006.

* cited by examiner

Primary Examiner—Christopher P. Schwartz
(74) Attorney, Agent, or Firm—Bugnion S.A.; John Moetteli

(57) ABSTRACT

The device, inserted between a motor (9) and a load (11), allows the load (11) to be immobilized when power is not applied to the motor (9) and allows mechanical torque to be transmitted when power is applied to the motor (9). Such a device is produced by virtue of a juxtaposition of brake disks rotatably connected alternately to the drive shaft (8) and to a casing (10) containing the motor (9) by sliding connections, the end disks (1, 3) of the juxtaposition being rotatably connected on the drive shaft (8) and by virtue of means (4, 5) collaborating to separate these disks and transmit the mechanical torque. The architecture of the device allows the string of dimensions associated with the functional clearance between the means (4, 5) to be reduced and allows the force exerted by the spring (6) on the disk (1) to be reacted by the bearing.

7 Claims, 2 Drawing Sheets

DISK-BRAKE AND TORQUE-TRANSMITTING DEVICE

BACKGROUND OF THE INVENTION

The present invention relates to a braking device inserted between a motor comprising a drive shaft and a load, comprising brake disks arranged facing each other, an[e]lastic means turning the disks against each other and means collaborating when the drive shaft of the motor is driven, to part the brake disks against the action of the elastic leans and for transmitting a mechanical torque from the drive shaft to a receiving shaft which rotates as one with one of the brake disks rotatably connected with the drive shaft, the receiving shaft being kinematically connected to the load.

The invention relates more specifically to a brake for a tubular motor for driving the winding tube of a roller shutter or the like.

PRIOR ART

Utility model IT-BO-92 U 000009 discloses a braking device arranged in the tube of the motor for driving the winding tube of a roller shutter or the like between the motor and a reduction gearset. The brake is in the "braked" position, preventing the winding tube from turning, when the drive shaft is stationary, and moves into the "free" position, freeing the winding tube to turn when the drive shaft is driven. This brake device also has the function o transmitting mechanical torque from the motor to the reduction gearset. The braking device comprises two brake disks arranged facing each other, one of which is rotatably mounted on the shaft of the motor and ends in a pinion which meshes with the reduction gearset and has a cut-out in which a pin housed in the drive shaft can move, and the other of which is fixed to the tube of the motor. The device also comprises a compression spring between a bearing the drive shaft and the brake disk rotatable mounted on the drive shaft. When no power is applied to the motor, the action of the spring on the disk rotatable mounted on the shaft presses the disks together. Thus, with the disks locked together, the input pinion of the reduction gearset is immobilized, and the roller shutter is therefore prevented from moving. When power is applied to the motor, the drive shaft turns with respect to the brake disks initially immobilized. This rotational movement with respect to the brake disk rotatable mounted on the drive shaft will, through action of the pin on the cut-out, cause the disk to effect a translational movement against the action of the spring, causing the disks to separate. The roller shutter is therefore released. Rotational movement of the shaft with respect to the disk continues until the axial force exerted by the disk reacting to the weight of the shutter balances the force of the spring or, failing that, until the pin meets an obstacle at the end of the cut-out, and mechanical torque is therefore transmitted from the motor to 1the reduction gearset and the roller shutter is therefore given an opening or closing movement.

Such a braking device requires, in the "braked" position, a clearance between the pin and the cut-out made in the disk, guaranteeing contact between the brake disks and therefore braking. This operating clearance needs to be controlled with precision because it also determines the amplitude of the rotational movement of the shaft with respect to the disk needed to separate the brake. Now, the string of dimensions involved in this operating clearance involves the pin, the drive shaft, the bearing, the tube of the motor and the disk As the number of these components is relatively large and as some of them have relatively large dimensions, manufacture and assembly need to be performed with great care in order to obtain an appropriate tolerance band on the operating clearance. These operations are therefore expensive. In addition, such a device, because of the location of the spring, leads to axial loads in the bearing and this dictates the use of a ball bearing to carry the shaft of the motor.

SUMMARY OF THE INVENTION

The object of the invention is to produce a braking device that alleviates these drawbacks. In particular, the invention proposes to produce a braking device in which, on the one hand, the string of dimensions associated with the functional clearance between the pin and the cut-out has an overall length shorter than the one disclosed in document IT-BO-92 U 000009 and, on the other hand, the force exerted by the spring on the disk is not reacted in the bearing supporting the drive shaft.

The device according to the invention is one which comprises a juxtaposition of disks connected alternately to the drive; shaft and to a casing containing the motor by sliding connections, the end disks of the juxtaposition being connected to the drive shaft.

According to an additional feature, the end disks of the juxtaposition are rotatably connected to the drive shaft.

According to another feature, the disks are rotatably connected to the drive shaft.

According to a preferred embodiment, the braking device comprises three brake disks.

The disks rotatably connected on the shaft are advantageously in sliding connection with each other.

According to one embodiment, one of the brake disks is rotatably connected to the drive shaft has a means which, combined with another means present on the shaft, allows the disks to be parted and another of the brake disks being rotatably connected with the drive shaft is secured to the receiving shaft.

According to another embodiment, one same brake disk is rotatable connected with the drive shaft has a means which, combined with another means present on the shaft, allows the disks to be parted and is secured to the receiving shaft.

The means collaborating to part the brake disks against the action of the elastic means may comprise a pin planted in the drive shaft and a ramp made on one of the brake disks is rotatable connected with the drive shaft.

BRIEF DESCRIPTION OF THE DRAWINGS

The appended drawing depicts, by way of example, two embodiments of the device according to the invention.

DESCRIPTION OF THE PREFERRED EMBODIMENT(s)

Figure 1:
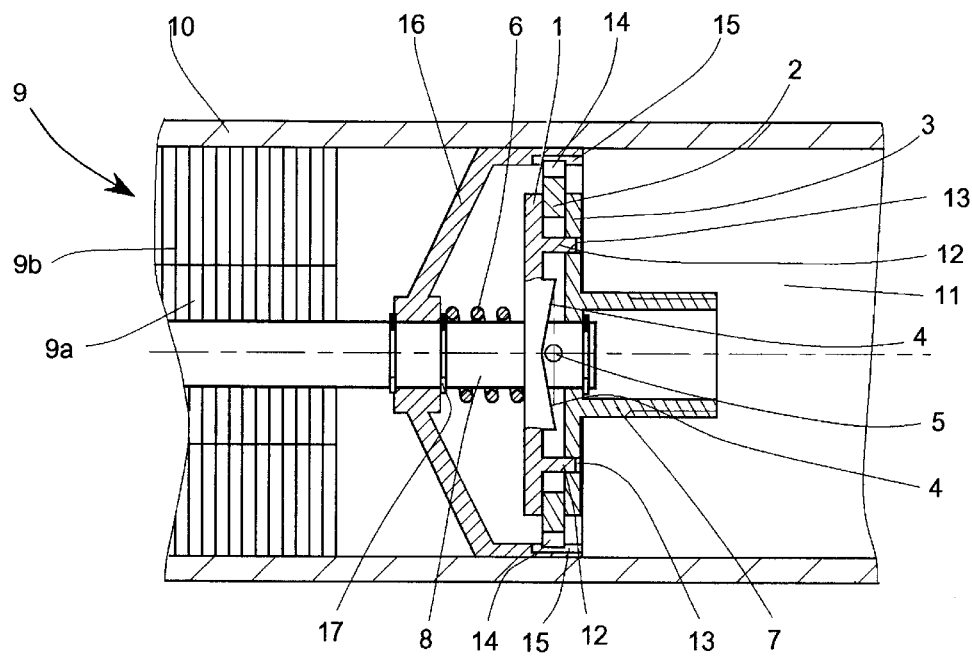
FIG. 1 is a view in axial section of the braking device according to a first embodiment, in the "braked" position.
Figure 2:
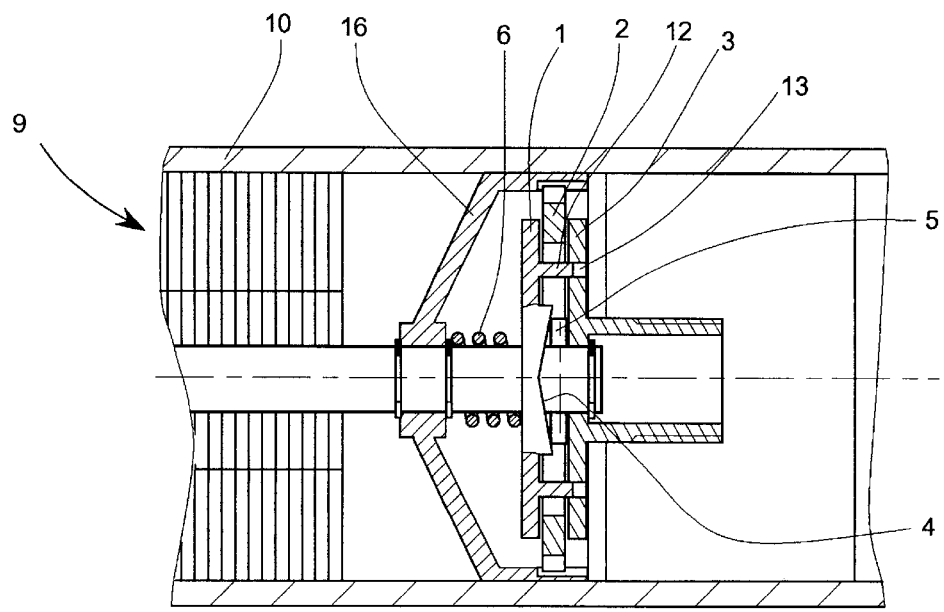
FIG. 2 depicts the brake of FIG. 1 in the "free" position.

The braking device depicted in FIGS. 1 and 2 is arranged in a cylindrical casing 10 between an electric motor 9, of which the rotor 9a and the stator 9b can be seen, and a reduction gearset 11. It allows a roller shutter to be prevented from opening or closing when no power is applied to the motor 9, and allows mechanical torque to be transmitted from a drive shaft 8 to a reduction gearset 11 to open or close a roller shutter when power is applied to the motor 9.

This braking device comprises three juxtaposed brake disks 1, 2, 3. Two of the disks, 1 and 3, are rotatable mounted on the shaft 8 bearing the rotor 9a of the motor 9 and the last is in sliding connection in the casing 10 by means of radial projections 14 sliding in slots 15 made in a bearing support 16 fixed to the casing 10. The disks 1 and 3 are in sliding connection with each other by means of spindles 12 present on the disk 1 and sliding in bores 13 made in the disk 3. The three disks are held pressed against each other by virtue of a spring 6 bearing against a stop element 17 and against the disk 1. The disk 3 is secured to a receiving shaft 7 so that it can mesh with the reduction gearset 11. The shaft 8 of the motor 9 has a radial drilling in which there is housed a pin 5 which projects. The disk 1 has an additional thickness in its central region in which a surface in the form of a double ramp 4 is formed, this being symmetric with respect to the plane perpendicular to the plane of the drawing and containing the axis of the shaft 8, this surface collaborating with the pin 5 to separate the disks and to transmit the torque of the shaft 8 to the disk 1 when power is applied to the motor.

When no power is applied to the motor 1, as depicted in FIG. 1, the three disks 1, 2, 3 pressed against each other connect the receiving shaft 7 meshing with the reduction gearset 11 to the casing 10. As this shaft 7 finds itself prevented from turning, the reduction gearset 11 and therefore the shatter find themselves locked in their position.

When power: is applied to the motor 9, as depicted in FIG. 2, the shaft 8 turns with respect to the disks 1, 2, 3 initially stationary This rotational movement of the shaft 8 with respect to the disk 1 brings the pin 5 into contact with on of the ramps 4. The action of this contact between the pin 5 and the ramp 4 creates in axial force against the thrust of the spring, allowing the disks to separate and, because of the slope of the ramp and the resistive torque offered by the reduction gearset and the roller shutter, the brake disks remain parted. The action of contact between the pin 5 and the ramp 4 creates, because of the slope of the ramp 4 and because of the coefficient of friction between the Sin 5 and the ramp 4, an orthoradial force which induces a mechanical torque from the shaft 8 on the disk 1. Thus, the rotational movement of the shaft 7 is freed and the mechanical power is transmitted from the shaft 8 to the reduction gearset 11 via the pin 5, the disk 1 and the disk 3, and the shutter is therefore driven.

Figure 3:
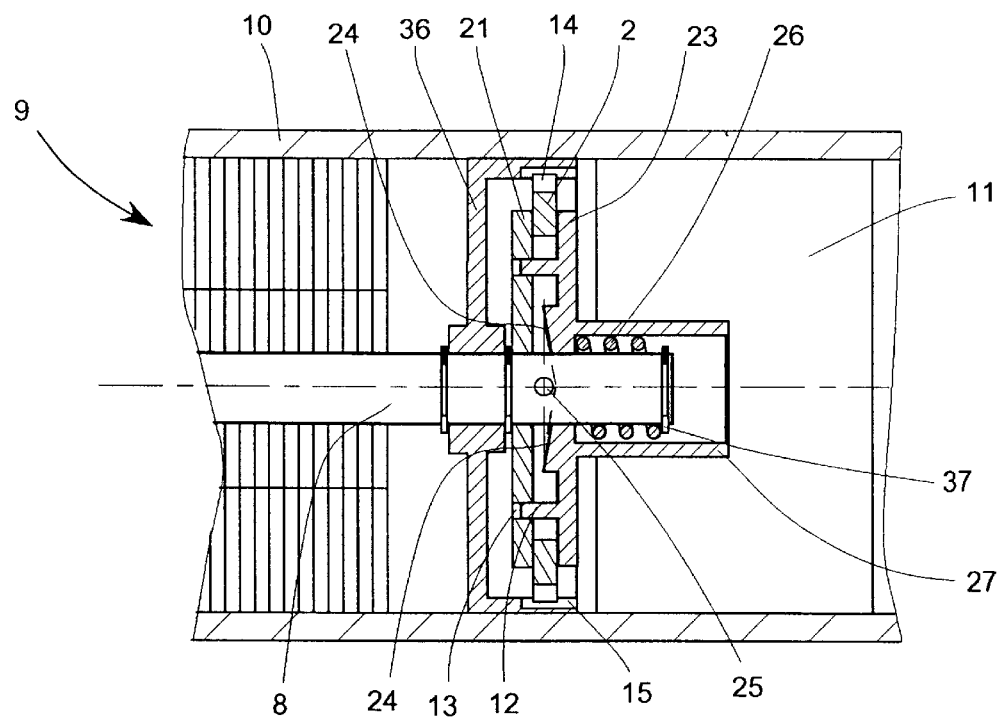
FIG. 3 is a view in axial section of the braking device according to a second embodiment, in the "braked" position.
Figure 4:
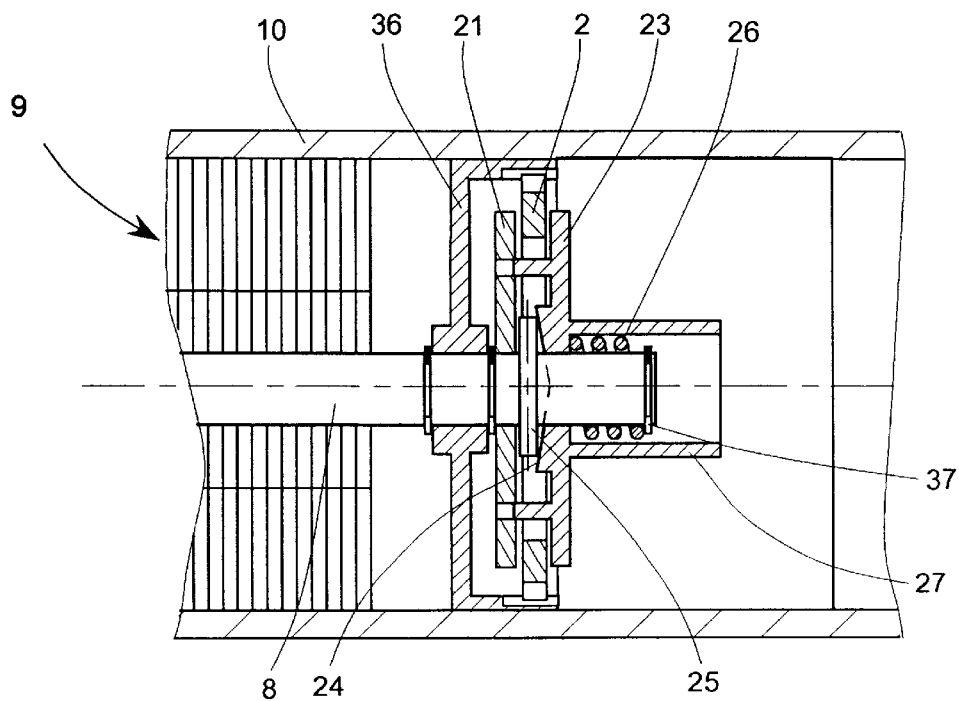
FIG. 4 depicts the brake of FIG. 3 in the "free" position.

The second embodiment of the braking device according to the invention depicted in FIGS. 3 and 4 differs from the First embodiment in that the receiving shaft 27 is sec red to the disk 23 on which is formed the double ramp 24 collaborating with the pin 25 to separate the disks 21, 2, 23 and transmit the mechanical torque to the receiving shaft 27 in the same way as in the first embodiment. In this embodiment, the mechanical power is transmitted from the shaft 8 to the reduction gearset 11 via the pin 25 and the disk 23. The drive shaft 8 enters the hollow shaft 27 and the spring 26 is housed in the hollow shaft 27 and bears against a stop element 37 and against the disk 23 to press the disks 21, 2, 23 against each other This makes the device more compact, the bearing support 36 being appreciably shorter than the bearing support 16 in the firs embodiment.

The braking device according to the invention can of course be applied to any system comprising a motor driving a load.

What is claimed:

1. A braking device inserted between a motor comprising a drive shaft and a load, comprising brake disks arranged facing each other, an elastic means returning the disks against each other and means collaborating when the drive shaft of the motor is driven, to part the brake disks against the action of the elastic means and for transmitting a mechanical torque from the drive shaft to a receiving shaft which rotates as one with one of the brake disks rotatable about the drive shaft, the receiving shaft being kinematically connected to the load, which braking device comprises a juxtaposition of the disks including end disks, the disks connected alternately to the drive shaft and to a casing containing the motor by sliding connections, the end disks of the juxtaposition being connected to the drive shaft.

2. The braking device as claimed in claim 1, wherein at least the end disks of the juxtaposition are rotatable connected about the drive shaft.

3. The braking device as claimed in claim 2, wherein the disks rotatable connected about the drive shaft are in sliding connection with each other.

4. The braking device as claimed in claim 3, wherein one of the brake disks in pivoting connection with the drive shaft has a means which, combined with another means present on the shaft, allows the disks to be parted and wherein another of the brake disks rotatably connected about the drive shaft is secured to the receiving shaft.

5. The braking device as claimed in claim 2, wherein one of the brake disks rotatably connected about the drive shaft has a means which, combined with another means present on the drive shaft, allows the disks to be parted and wherein said disk is secured to the receiving shaft.

6. The braking device as claimed in claim 2, wherein the means collaborating to part the brake disks against the action of the elastic means comprise a pin planted in the drive shaft and a ramp made on one of the brake disks rotatably connected about the drive shaft.

7. The braking device as claimed in claim 1, consisting of three brake disks.

* * * * *